US012769769B2

(12) United States Patent
Mahfoud et al.

(10) Patent No.: US 12,769,769 B2
(45) Date of Patent: Oct. 20, 2026

(54) DOMAIN-SPECIFIC SHORTHAND FOR GENERATION OF DATA VISUALIZATIONS BASED ON CONTEXT FREE GRAMMAR

(71) Applicant: Salesforce, Inc., San Francisco, CA (US)

(72) Inventors: Elias Mahfoud, Kenmore, WA (US); Andriy Kanyuka, Vancouver (CA)

(73) Assignee: Salesforce, Inc., San Francisco, CA (US)

( * ) Notice: Subject to any disclaimer, the term of this patent is extended or adjusted under 35 U.S.C. 154(b) by 202 days.

(21) Appl. No.: 18/674,802

(22) Filed: May 24, 2024

(65) Prior Publication Data

US 2025/0363141 A1 Nov. 27, 2025

(51) Int. Cl.
*G06F 16/3329* (2025.01)
*G06F 16/34* (2025.01)
*G06F 40/205* (2020.01)

(52) U.S. Cl.
CPC .......... *G06F 16/3329* (2019.01); *G06F 16/34* (2019.01); *G06F 40/205* (2020.01)

(58) Field of Classification Search
CPC ..... G06F 16/3329; G06F 16/34; G06F 40/205
See application file for complete search history.

(56) References Cited

U.S. PATENT DOCUMENTS

2020/0110779 A1 * 4/2020 Setlur ............... G06F 16/24522

OTHER PUBLICATIONS

Lee et al., "SJSON: A succinct representation for JSON documents." Information Systems 97 (2021): 101686 (Year: 2021).*

* cited by examiner

*Primary Examiner* — Bhavesh M Mehta
*Assistant Examiner* — Jangwoen Lee
(74) *Attorney, Agent, or Firm* — Morgan, Lewis & Bockius LLP

(57) ABSTRACT

System, method and interface for generating data visualizations are provided. The system receives a user input to specify a natural language command directed to a data source. The system also generates a prompt for generating a data visualization based on relevant data fields and data values, rules that characterize the data visualization, and a context free grammar. The system also prompts a trained large language model using the prompt to generate a structured document following a domain-specific schema based on a shorthand notation. The system also uses a parser that uses the context free grammar to map the structured document to a visual specification. The visual specification specifies the data source, visual variables, and data fields from the data source. The system also generates and displaying a data visualization based on the visual specification, including displaying visual marks representing data, retrieved from the data source, for the data fields.

18 Claims, 5 Drawing Sheets

102

114

DOMAIN-SPECIFIC SHORTHAND FOR GENERATION OF DATA VISUALIZATIONS BASED ON CONTEXT FREE GRAMMAR

TECHNICAL FIELD

The disclosed implementations relate generally to data visualization and more specifically to systems and methods that enable generation of data visualizations using a large language model.

BACKGROUND

A visual specification is a structured representation of the design and configuration of a data visualization. A visual specification encodes necessary information to render a specific visualization, such as a data source, visual encodings, layout, and styling. A visual specification typically takes the form of a JSON (JavaScript Object Notation) or XML (Extensible Markup Language) file that adheres to a predefined schema. This schema defines the structure and properties that the visual specification should contain.

Large Language Models (LLMs) can be used for generating visual specifications. LLMs can be trained to understand natural language descriptions of visualizations and translate them into structured visual specifications. For instance, a user could provide a textual description like "Create a bar chart with category names on the x-axis and sales values on the y-axis, sorted in descending order," and the LLM would generate the corresponding visual specification. The generation of structured data in formats, such as JSON, and XML, pose particular challenges. These formats, while widely used, contain many redundant constructs that lead to inflated token usage. This inefficiency is particularly evident when employing large language models (LLMs) like GPT-4, where generating extensive structured data incurs increased latency and operational costs.

SUMMARY

Accordingly, there is a need for systems and methods for efficiently generating and/or displaying data visualizations using large language models. Described herein is a method that utilizes a domain-specific shorthand (DSS) format, underpinned by a context free grammar (CFG), to reduce the token count required for structured data generation. This method involves creating a shorthand notation that captures the structured data's essential elements with fewer tokens, ensuring it can be unambiguously converted to and from its verbose form. Some implementations use a CFG to facilitate efficient shorthand notation generation by the LLM and to generate parsers for translating the shorthand back into standard structured formats. The application of the techniques described herein to generate data visualizations with LLMs demonstrates a 78% reduction in token generation, leading to significantly lower latency and cost. Described herein are example details of the DSS and the CFG structure. Also described are example generative AI applications using the techniques described herein. The techniques present a scalable solution to the token inefficiency problem in structured data generation.

According to some implementations, a method is provided for generating data visualizations from natural language expressions, according to some implementations. The method is performed at a computing device having a one or more processors, and memory storing one or more programs configured for execution by the one or more processors. The method includes receiving a user input to specify a natural language command directed to a data source. The method also includes generating a prompt for generating a data visualization based on relevant data fields and data values, one or more rules that characterize the data visualization, and a context free grammar. The method also includes prompting a trained large language model using the prompt to generate a structured document following a domain-specific schema based on a shorthand notation. The method also includes using a parser that uses the context free grammar to map the structured document to a visual specification, wherein the visual specification specifies the data source, a plurality of visual variables, and a plurality of data fields from the data source. The method also includes generating and displaying a data visualization based on the visual specification, including displaying a plurality of visual marks representing data, retrieved from the data source, for the plurality of data fields.

In some implementations, the method further includes encoding data, for a current visualization, based on the shorthand notation and the context free grammar, and while prompting the trained large language model, inputting the encoded data along with the prompt, to generate the structured document.

In some implementations, the method further includes parsing the natural language command to identify key phrases, and identifying the relevant data fields and data values from the data source using semantic search, based on the key phrases.

In some implementations, the CFG includes one or more grammar rules for specifying data fields from an underlying data source to be used in the data visualization, field type, how field values are mapped to visual properties including color, size, shape and position, filters to apply to data used in the data visualization, and how data in the data visualization is to be sorted, type of chart to be used in the data visualization.

In some implementations, the trained large language model is trained on a dataset of JSON, YAML, XML, and/or Python code, which represents a desired structure of output documents.

In some implementations, the shorthand notation reduces the number of tokens required to represent visualization specifications for improving token efficiency of the trained large language model.

In some implementations, the CFG allows unambiguous conversion of an input in the shorthand notation back to a full visual specification, ensuring no loss of information in visualization requirements.

In some implementations, the domain-specific schema captures visualization components, including fields, filters, and sorting criteria, which are common across various visualization types.

In some implementations, the shorthand notation is dynamically adapted based on a domain-specific vocabulary and common patterns observed in data, including applying one or more machine learning algorithms to evolve the shorthand notation over time.

In some implementations, the CFG detects and/or corrects errors in processing shorthand notation, incorporating feedback loops that allow the CFG to learn from corrections, thereby improving accuracy and/or reliability of the shorthand notation over time.

In another aspect, an electronic device includes one or more processors, memory, a display, and one or more programs stored in the memory. The programs are configured for execution by the one or more processors and are configured to perform any of the methods described herein.

In another aspect, a non-transitory computer readable storage medium stores one or more programs configured for execution by a computing device having one or more processors, memory, and a display. The one or more programs are configured to perform any of the methods described herein.

Thus methods, systems, and graphical user interfaces are disclosed that allow efficient generation of data visualizations.

Both the foregoing general description and the following detailed description are exemplary and explanatory and are intended to provide further explanation of the invention as claimed.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Description of Implementations below, in conjunction with the following drawings in which like reference numerals refer to corresponding parts throughout the figures.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Figure 1A:
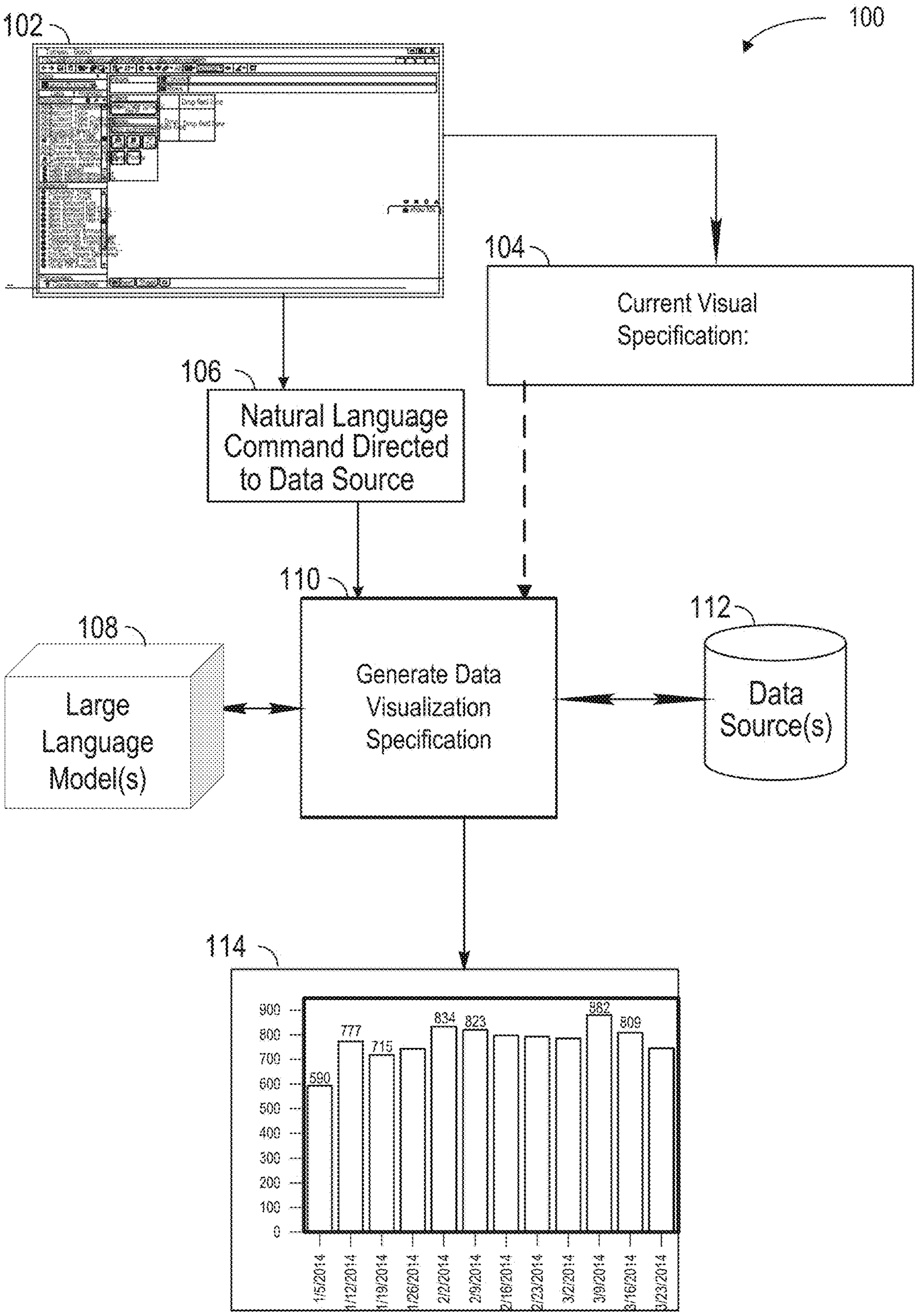
FIG. 1A is a schematic diagram of an example interactive data visualization application, according to some implementations.
Figure 1B:
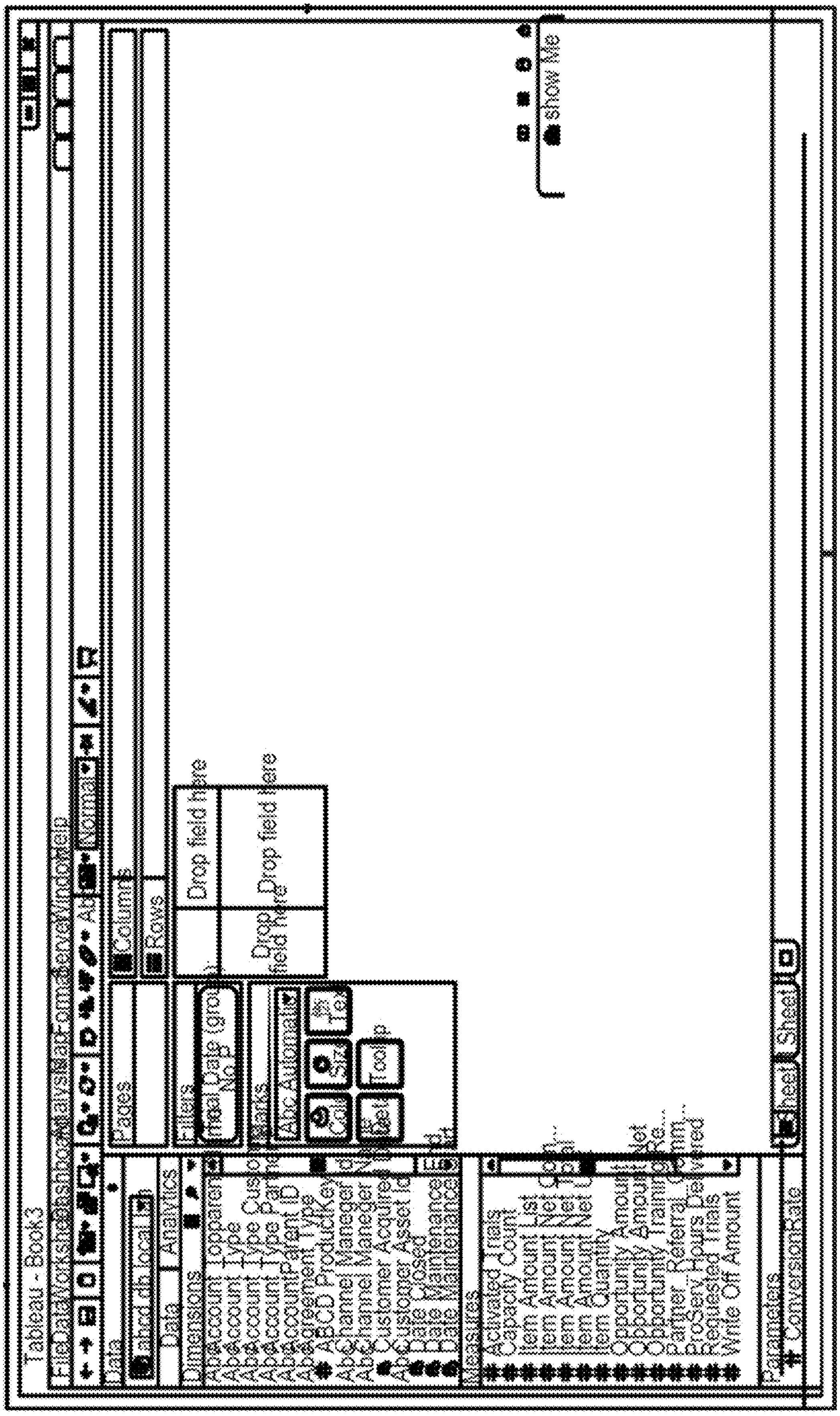
FIG. 1B shows an enlarged view of an example data visualization user interface, according to some implementations.
Figure 1C:
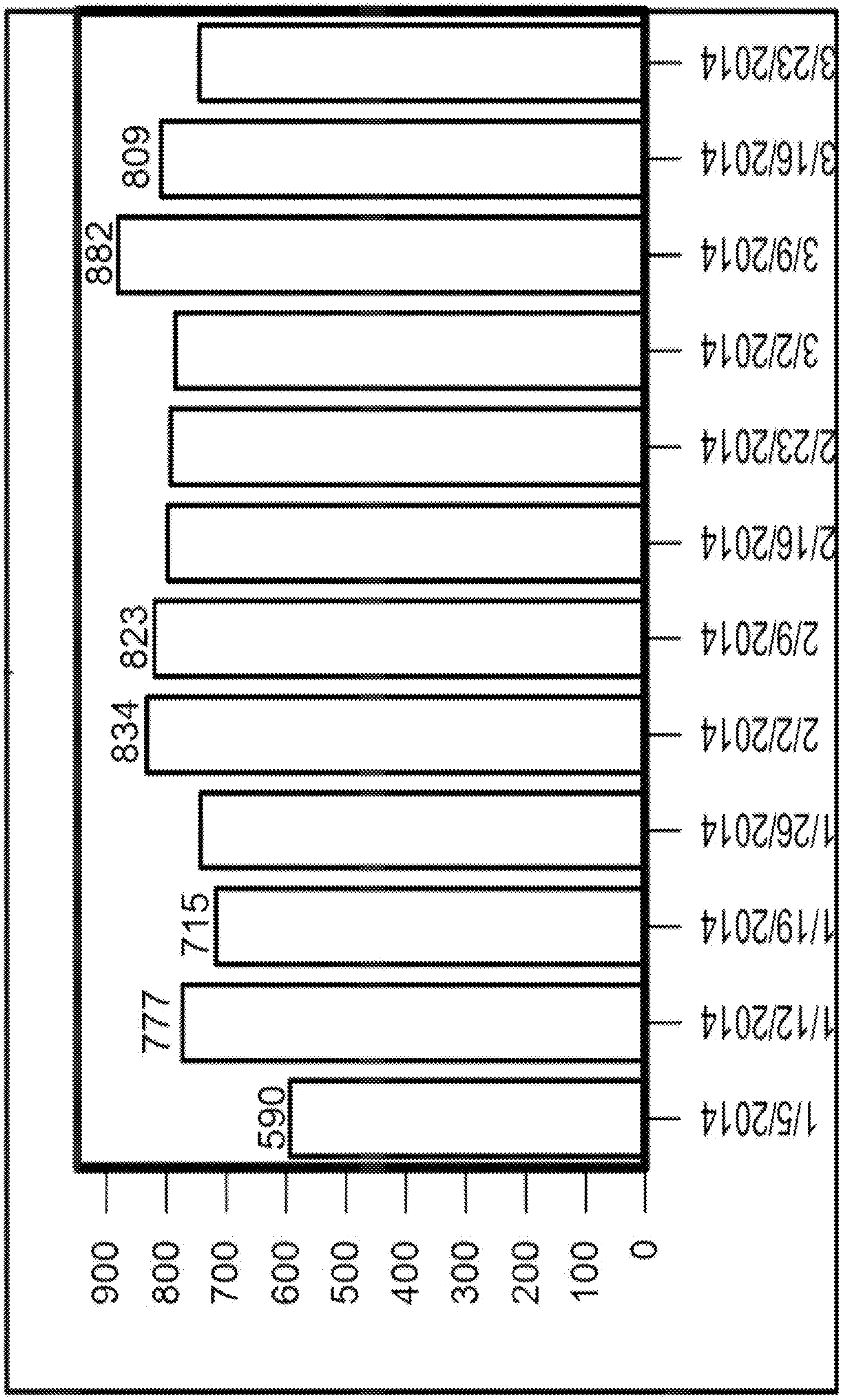
FIG. 1C shows an enlarged view of an example data visualization, according to some implementations.

FIG. 1 is a schematic diagram of an example interactive data visualization application 100, according to some implementations. The interactive data visualization application uses a data visualization user interface 102 to build a current visual specification 104. The current visual specification 104 identifies one or more data sources 112, which may be stored locally (e.g., on the same device that is displaying the user interface 102) or may be stored externally (e.g., on a database server or in the cloud). The current visual specification 104 also includes visual variables. The visual variables specify characteristics of the desired data visualization indirectly according to selected data fields from the data sources 112. In particular, a user assigns zero or more data fields to each of the visual variables, and the values of the data fields determine the data visualization that will be displayed. Not all of the visual variables may be used. Some of the visual variables have two or more assigned data fields. The order of the assigned data fields for the visual variable can affect how the data visualization is generated and displayed. A natural language command 106 is directed to the one or more data sources 112. In response, the application generates a data visualization specification 110, using one or more trained large language models 108. The application 100 uses the data visualization application specification to generate and/or display a data visualization 114. FIG. 1B shows an enlarged view of the example data visualization user interface 102, according to some implementations. FIG. 1C shows an enlarged view of the example data visualization application 114, according to some implementations.

Figure 2:
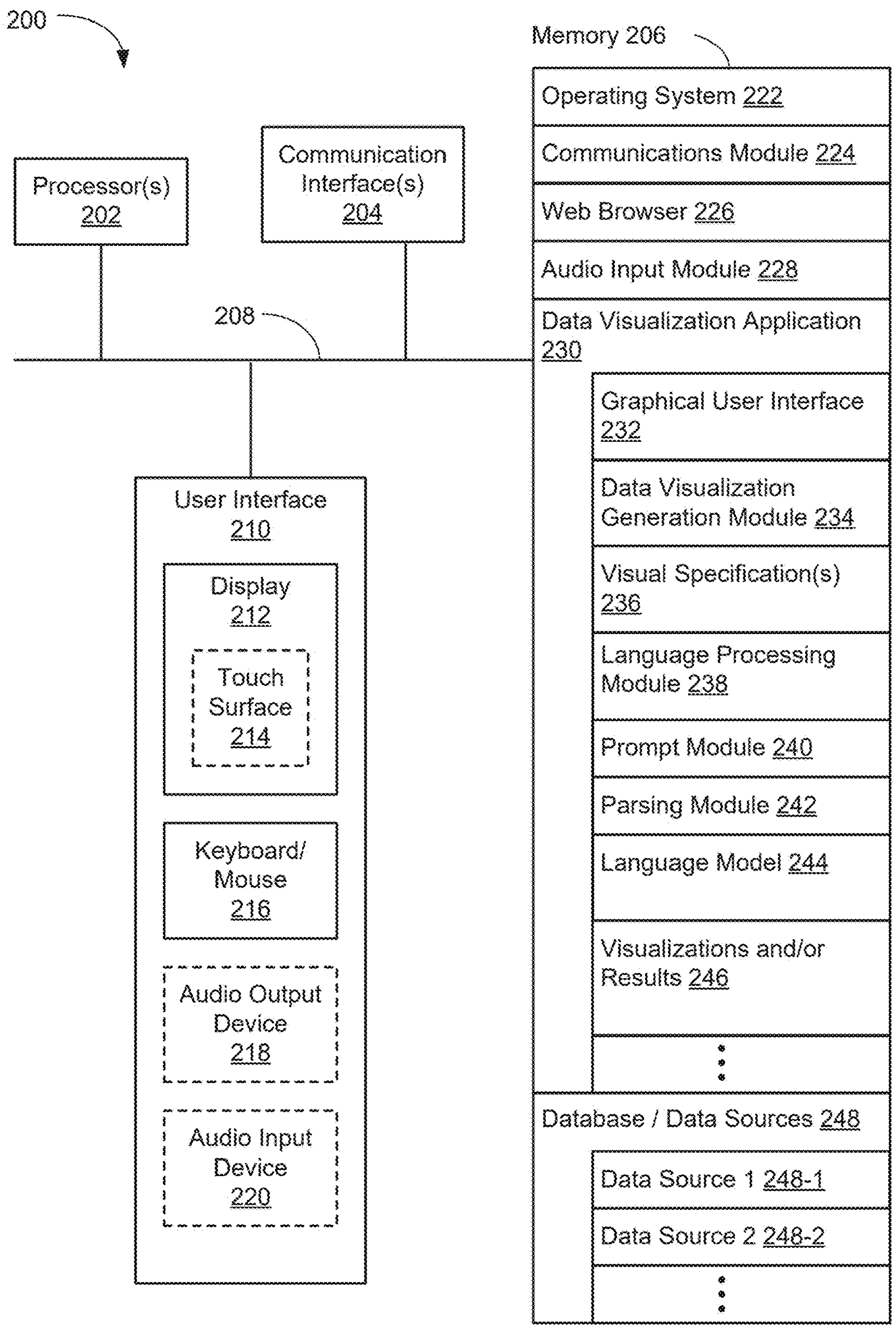
FIG. 2 is a block diagram of an example computing device for generating and/or displaying data visualizations, according to some implementations.

FIG. 2 is a block diagram of an example computing device 200 for generating and/or displaying data visualizations, according to some implementations. In some implementations, the computing device 200 displays a graphical user interface 102. Computing devices 200 include desktop computers, laptop computers, tablet computers, and other computing devices with a display and a processor capable of running a data visualization application. A computing device 200 typically includes one or more processing units/cores (CPUs) 202 for executing modules, programs, and/or instructions stored in the memory 206 and thereby performing processing operations; one or more network or other communications interfaces 204; memory 206; and one or more communication buses 208 for interconnecting these components. The communication buses 208 may include circuitry that interconnects and controls communications between system components. A computing device 200 includes a user interface 210 comprising a display 212 and one or more input devices or mechanisms 210. In some implementations, the input device/mechanism includes a keyboard 216. In some implementations, the input device/mechanism includes a "soft" keyboard, which is displayed as needed on the display 212, enabling a user to "press keys" that appear on the display 208. In some implementations, the display 212 and input device/mechanism comprise a touch screen display 214 (also called a touch sensitive display). In some implementations, the display is an integrated part of the computing device 200. In some implementations, the display is a separate display device. Some implementations include an audio input device 220 and/or an audio output device 218. The input devices or mechanisms can be used to provide natural language commands directed to data sources.

In some implementations, the memory 206 includes high-speed random-access memory, such as DRAM, SRAM, DDR RAM or other random-access solid-state memory devices. In some implementations, the memory 206 includes non-volatile memory, such as one or more magnetic disk storage devices, optical disk storage devices, flash memory devices, or other non-volatile solid-state storage devices. In some implementations, the memory 206 includes one or more storage devices remotely located from the processors 202. The memory 206, or alternatively the non-volatile memory devices within the memory 206, comprises a non-transitory computer-readable storage medium. In some implementations, the memory 206, or the computer-readable storage medium of the memory 206, stores the following programs, modules, and data structures, or a subset thereof:

- an operating system 222, which includes procedures for handling various basic system services and for performing hardware dependent tasks;
- a communication module 224, which is used for connecting the computing device 200 to other computers and devices via the one or more communication network interfaces 204 (wired or wireless) and one or more communication networks, such as the Internet, other wide area networks, local area networks, metropolitan area networks, and so on;

an optional web browser 226 (or other client application), which enables a user to communicate over a network with remote computers or devices;

an optional audio input module 228 to process audio signals received from the audio input device 220, and/or output audio signals to the audio output device 218;

a data visualization application 230, which provides a graphical user interface 102 for a user to construct visual graphics (e.g., an individual data visualization or a dashboard with a plurality of related data visualizations). In some implementations, the data visualization application 230 executes as a standalone application (e.g., a desktop application). In some implementations, the data visualization application 230 executes within the web browser 226 (e.g., as a web application);

a graphical user interface 232, which enables a user to build a data visualization by specifying elements visually. In some implementations, the user interface 102 includes a plurality of shelf regions, which are used to specify characteristics of a desired data visualization. In some implementations, the shelf regions include a columns shelf and a rows shelf, which are used to specify the arrangement of data in the desired data visualization. In general, fields that are placed on the columns shelf are used to define the columns in the data visualization (e.g., the x-coordinates of visual marks). Similarly, the fields placed on the rows shelf define the rows in the data visualization (e.g., the y-coordinates of the visual marks). In some implementations, the shelf regions include a filters shelf, which enables a user to limit the data viewed according to a selected data field (e.g., limit the data to rows for which a certain field has a specific value or has values in a specific range). In some implementations, the shelf regions include a marks shelf, which is used to specify various encodings of data marks. In some implementations, the marks shelf includes a color encoding icon (to specify colors of data marks based on a data field), a size encoding icon (to specify the size of data marks based on a data field), a text encoding icon (to specify labels associated with data marks), and/or a view level detail icon (to specify or modify the level of detail for the data visualization);

a data visualization generation module 234, which generates visualizations and/or results 246, based on visual specifications 236. The data visualization generation module 234 generates and/or displays data visualizations according to visual specifications 236, generated based on results from language processing module 238, prompt module 240, parsing module 242, and/or language model 244. The data visualization generation module 234 can include visualization parameters, which contain information used by the data visualization application 230 other than the information provided by the visual specifications 230 and the data sources 248;

the visual specifications 236, which are used to define characteristics of a desired data visualization. In some implementations, the visual specifications 236 is built using the user interface 102. A visual specification includes identified data sources 248 (i.e., specifies what the data sources are), which provide enough information to find the data sources 248 (e.g., a data source name or network full path name). A visual specification 236 also includes visual variables, and the assigned data fields for each of the visual variables. In some implementations, a visual specification has visual variables corresponding to each of the shelf regions. In some implementations, the visual variables include other information as well, such as context information about the computing device 200, user preference information, or other data visualization features that are not implemented as shelf regions (e.g., analytic features);

a language processing module 238 for parsing natural language utterances (sometimes referred to as commands or natural language queries) directed to the data sources 248. In some implementations, the language processing module 238 includes semantic search for understanding conceptual meaning of a query by analyzing relations between words, phrases and/or concepts in the natural language query. This may include natural language processing (NLP) techniques to analyze the structure and meaning of the query, including part-of-speech tagging, named entity recognition and/or sentiment analysis, sentiment analysis for identifying key concepts, entities and relationships present in the query and the content, e.g., using knowledge bases, ontologies and/or taxonomies;

a prompt module 240 for generating prompts for large language models. This module may include NLP model trained to understand natural language descriptions or instructions and convert them into structured prompts suitable for LLMs. Some implementations include optimization(s) to select the suitable prompt based on criteria such as performance metrics, user preferences and/or domain specific characteristics (e.g., for data visualization specification generation). The prompt module 240 generates prompts based on relevant data fields and data values, rules that characterize the data visualization, and/or a context free grammar (CFG), details of which are described below. The prompt module 240 also prompts the trained large language model 244 using the prompts to generate a structured document following a domain-specific schema based on a shorthand notation, details of which are described below, according to some implementations. The prompt module 240 also stores any data structures (e.g., the grammar, the rules, and/or the shorthand notation) for performing the operations described herein;

a parsing module 242 for using the context free grammar to map the structured document to a visual specification 236. In some implementations, the visual specification specifies a data source, a plurality of visual variables, and a plurality of data fields from the data source;

a language model 244 includes one or more large language models (LLMs) that are trained to generate structured documents. In some implementations, the large language models are finetuned using visual specifications;

visualizations and/or results 246 generated by the data visualization generation module 234 based on results from the prompt module 240; and/or zero or more databases or data sources 248 (e.g., a first data source 248-1), which are used by the data visualization application 230. In some implementations, the data sources are stored as spreadsheet files, CSV files, XML files, flat files, JSON files, tables in a relational database, cloud databases, or statistical databases.

Each of the above identified executable modules, applications, or set of procedures may be stored in any of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 206 stores a subset of the modules and data structures identified above. In some implementations, the memory 206 stores additional modules or data structures not described above. Although FIG. 2 shows a computing device 200, FIG. 2 is intended more as functional description of the various features that may be present rather than as a structural schematic of the implementations described herein. In practice, and as recognized by those of ordinary skill in the art, items shown separately could be combined and some items could be separated.

Large language models (LLMs), such as GPT, learn context free grammars (CFGs). For example, pre-trained transformers can generate sentences with near-perfect accuracy and impressive diversity for challenging CFGs. The hidden states of the transformers can implicitly encode the CFG structure, and the transformers could form boundary to boundary attentions that mimic dynamic programming. Grammar prompting is a method to enable LLMs to use external knowledge and domain-specific constraints, expressed through a grammar in Backus-Naur Form (BNF), during in-context learning. The method augments each demonstration example with a specialized grammar that is minimally sufficient for generating the particular output example. The LLM first predicts a BNF grammar given a test input, and then generates the output according to the rules of the grammar. The problem of neural text generation can be expressed in terms of transitions between the states of a finite-state machine. This approach allows the construction of an index over a language model's vocabulary, enabling the enforcement of domain-specific knowledge and constraints, and guaranteeing the structure of the generated text. Conventional frameworks, such as SynCode, can provide efficient and general syntactical decoding with LLMs. SynCode leverages the CFG of a formal language, utilizing an offline-constructed efficient lookup table based on the discrete finite automaton (DFA) of the language grammar terminals. The framework can eliminate syntax errors and significantly outperform state-of-the-art baselines in generating JSON, Python, and Go outputs. Decoding algorithms can enforce constraints in a fully subword-aligned fashion, while leveraging pre-computation and speculative decoding to achieve virtually no overhead and in some cases even almost 2 times speedup over unconstrained decoding. Traditional methods for grammar-constrained decoding (GCD) can serve as a unified framework for structured NLP tasks in general. Input-dependent grammars allow the grammar to depend on the input and thus enable the generation of different output structures for different inputs.

Large Language Models (LLMs) can be used to generate structured data in formats, such as JSON, YAML, and XML. These formats are widely used for structuring data due to their versatility and compatibility across different systems. However, these formats are characterized by a high redundancy of keywords, which significantly increases the number of tokens that language models (e.g., GPT-4) need to generate. This redundancy not only escalates computational demands but also elevates the associated costs and latency, particularly when leveraging the capabilities of advanced models. The operational efficiency of LLMs, particularly in terms of response time and cost-effectiveness, is significantly compromised by the verbosity of these standard data formats. High latency can degrade the user experience by making generative artificial intelligence applications less responsive, while high computational costs can restrict the scalability of these technologies, posing a significant barrier to entry for smaller entities or individuals with limited financial resources. The redundancy inherent in standard data formats not only necessitates the generation of a larger number of tokens by LLMs but also potentially pushes the limits of these models, which often have a maximum token limit for each processing request. This limitation may require additional processing steps to assemble larger data structures from multiple outputs, further increasing the overall latency and adding complexity to the development process. Therefore, a problem at hand is the inefficiency in generating structured data using LLMs, primarily due to the verbose and redundant nature of standard data formats. This inefficiency manifests as increased latency and higher operational costs, which in turn, negatively affects the scalability, accessibility, and user experience of generative artificial intelligence applications.

To address at least some of these challenges, described herein is a method that incorporates a Domain-Specific Shorthand (DSS) (sometimes referred to as a shorthand notation) in conjunction with a Context free grammar (CFG) to streamline the output of LLMs. The techniques described herein curtail the token count required for generating structured data, thereby enhancing both the efficiency and cost-effectiveness of data generation processes. Some implementations use a shorthand notation tailored to the domain-specific requirements of structured data generation (e.g., generation of visualization specification for data visualization). This notation is designed to be both concise and expressive, enabling a significant reduction (e.g., 3 to 5 times) in token usage without compromising the integrity or the expressiveness of the generated data.

Described below are example implementations that illustrate utility of the techniques for the generation of visualization specifications using an LLM. Some implementations use a shorthand notation to minimize token generation and apply a CFG for an efficient description of this notation to LLMs. Also described herein is an example process for the DSS. By transitioning from a general-purpose representation to a domain-specific shorthand, experiments showed a substantial decrease in token usage, achieving a 78% reduction for generation of visualization specification for data visualization purposes.

Some implementations use a Domain-Specific Shorthand (DSS) in conjunction with a Context free grammar (CFG) to enhance the efficiency of the generation process. The domain-specific shorthand (DSS) notation helps reduce the verbosity typical of general-purpose structured data formats, such as JSON, YAML, and XML. By minimizing verbosity, DSS decreases the number of tokens required, leading to a reduction in generation time and associated costs. The shorthand notation is designed to encapsulate the critical elements of structured data succinctly, focusing on the domain of data visualization as an example. Attributes like field names, aggregation functions, and filters are represented in a more compact format, reducing the syntactic overhead and simplifying the generation process for large language models (LLMs).

Some implementations use a Context free grammar (CFG), providing a clear and efficient description of the shorthand notation for LLMs. The CFG defines a set of production rules that specify how elements of the shorthand notation can be combined to produce valid structured outputs. These rules are minimal yet comprehensive, ensuring that the LLM can generate shorthand notation that is syntactically correct and semantically consistent with the domain-specific requirements. Additionally, CFG supports the development of parsers for translating shorthand notation back into full specification formats, maintaining interoperability and flexibility.

The development of a DSS begins with analyzing the general-purpose representation of structured data (e.g., a visualization specification) to identify opportunities for simplification and abstraction into a more concise notation. Following this, a CFG is developed to describe the shorthand notation in a manner understandable to an LLM, guiding it to generate shorthand that is both compact and adherent to the structure and semantics defined. Parsers and mappers are then created to facilitate the conversion between the DSS and the full specification formats, ensuring that the shorthand notation can be seamlessly integrated with existing systems and applications that utilize standard structured data formats.

Overall, the design and implementation of the DSS, underpinned by CFG, offer a streamlined and cost-effective method for generating structured data with LLMs. This approach addresses the challenges of latency and cost by reducing the token count, simplifying the generation process, and ensuring easy conversion between shorthand and full specification formats.

The trained LLMs may include pre-trained models, such as GPT-4, which may be further finetuned for the purpose of generating visualization specifications and/or shorthand notations described herein. Large Language Models (LLMs) can be trained on a variety of data formats, including JSON and Python code, to generate structured documents. In some implementations, for training such models, a first step includes collecting a large dataset of JSON files or Python code that represent the desired structure of the output documents. This dataset is diverse and representative of the types of documents (e.g., visual specifications) to generate. The data may be preprocessed. The raw data may need to be preprocessed to prepare it for training. This can involve tasks like cleaning the data, removing irrelevant parts, tokenizing the text, and converting it into a format suitable for the LLM's input. Subsequently, in some implementations, the model is trained using the preprocessed data for a language modeling task. The model is trained to take the input (e.g., a prompt or description) and generate the corresponding structured output (e.g., JSON or Python code).

The trained language model may be fine-tuned. Depending on the complexity of the task and the size of the dataset, the LLM may need to be fine-tuned on the specific domain and data format. Fine-tuning involves further training the model on a target dataset to adapt it to the task at hand. For generating data visualization specification, the trained language model may be finetuned for a specific visualization specifications for data visualizations. After the model is trained, the trained model can be used to generate structured documents based on new prompts or inputs. The model will output the corresponding JSON or Python code, for example, which can then be parsed and processed as needed. There are a few key considerations when training LLMs for the task of data visualization specification generation. In some implementations, the training data and/or target data for finetuning is formatted in a way that preserves the structure of the JSON or Python code, for example, allowing the model to learn the patterns and relationships within the data. Appropriate evaluation metrics, such as BLEU score, perplexity, or task-specific metrics, can be used to measure the model's performance and guide the training.

Example Generation of Data Visualization

In some implementations, the techniques described above are used for generation of data visualizations using a large language model. These operations typically necessitate the LLM to output structured data, such as JSON, which serves as API payloads for accessing the underlying data and rendering the actual visualizations. Towards this end, some implementations define a domain-specific schema tailored for data visualization (an example which is shown below). This schema captures visualization components, such as fields, filters, and sorting criteria, which are common across various visualization types (e.g., bar charts, line graphs). Example components of the schema include aggregation (e.g., month, sum), encoding (e.g., x, y), field name (e.g., field 1, total sales), role (e.g., dimension, measure), type (e.g., continuous, discrete), and data type (e.g., date, number). Example filter related information include filters for duration, field name (e.g., "Product [ ] \"Name\"", "Product", "Entry Date"), filter type (e.g., categorical, relative date, data range, numeric range), values (e.g., "First Product", "(Second) Product { }", "First", "Second"), units (e.g., years). Example sorting criteria include aggregation (e.g., sum), direction (e.g., descending), field name (e.g., "Region"), limit (e.g., 5), and sort by field (e.g., "Sales").

An example full specification or domain-specific schema is provided below, according to some implementations. The specification includes 362 tokens.

```
{
  "fields": [
  {
  "aggregation": "month",
  "encoding": "x",
  "fieldName": "field1",
  "role": "dimension",
  "type": "continuous",
  "dataType": "date"
  },
  {
  "aggregation": "sum",
  "fieldName": "Total Sales",
  "role": "measure",
  "type": "continuous",
  "dataType": "number"
  }
 ],
 "filters": [
 {
  "fieldName": "Product[ ]\"Name\"",
  "filterType": "categorical",
  "values": [
   "First Product",
   "(Second) Product{ }"
  ]
 },
 {
  "fieldName": "Product",
  "filterType": "categorical",
  "values": [
   "First",
   "Second"
  ]
 },
```

```
{
  “duration”: 2,
  “fieldName”: “Entry Date”,
  “filterType”: “relative-date”,
  “units”: “years”
},
{
  “aggregation”: “month”,
  “end”: “2023-12-31”,
  “fieldName”: “Entry Date”,
  “filterType”: “date-range”,
  “start”: “2022-01-01”
},
{
  “aggregation”: “sum”,
  “end”: 10000,
  “fieldName”: “Sales”,
  “filterType”: “numeric-range”,
  “start”: 1000
  }
],
“sort”: [
{
  “aggregation”: “sum”,
  “direction”: “desc”,
  “fieldName”: “Region”,
  “limit”: 5,
  “sortByField”: “Sales”
  }
]
```

Based on this schema, some implementations use a shorthand notation (an example of which is shown below) that reduces the verbosity inherent in JSON or similar structured. For instance, the shorthand notation condenses complex JSON structures into concise, easily parseable lines of code, guided by a context free grammar (CFG) specifically developed for this purpose.

In some implementations, the shorthand notation and CFG have the following characteristics:

1. Token efficiency: the notation significantly reduces the number of tokens required to represent visualization specifications.
2. Unambiguous mapping: allow for a clear and straightforward conversion back to the full JSON representation, ensuring no loss of information or ambiguity in the visualization requirements.

An example shorthand notation (for the full specification listed above) is shown below, according to some implementations.

```
fields:
cd “field1” month x
cm “Total Sales” sum
filters:
cat “Product[ ]\“Name\”” values “First Product” “(Second) Product{ }”
cat “Product” values “First” “Second”
rd “Entry Date” 2 years
dr “Entry Date” month start 2022-01-01 end 2023-12-31
nr “Sales” sum start 1000 end 10000
sort:
“Sales” sum desc 5 “Region”
```

An example context free grammar (CFG) (in BNF notation) used by some implementations is shown below.

```
#CFG for high-level representation of dataset visualization in BNF notation
#Lines starting with #are comments
#ε means empty string
<VizSpec>::=<Fields><Filters><Sorting><ChartType>
#list of fields from the underlying dataset to be used in the visualization
#may not include duplicates i.e fields with the same name
#must consist of the minimal subset of the dataset fields that satisfy the user query
<Fields>::=fields:\n<Field> . . .
<Field>::=<FieldType><FieldName><Aggregation><Encoding>\n
#FieldType should be continuous measure cm, continuous dimension cd or discrete dimension dd
#insert or update it only if it’s mentioned in user request, otherwise leave as is
<FieldType>::=cm|cd|dd|ε
#how the field values should be mapped to visual properties such as color, size, shape and position
<Encoding>::=color|size|shape|x|y|text|ε
<Aggregation>::=count|countDistinct|sum|average-|max|min|median|year|quarter|month|week|day|hour-|minute|second|ε
#filters to apply to the data used in the visualization
#non-empty only if user utterances mention filtering
<Filters>::=filters:\n<Filter> . . . |ε
Filter::=
<CategoricalFilter>|<RelativeDateFilter>|<DateRange Filter>|<NumericalRangeFilte r>
#Categorical filter e.g. “show only banking and healthcare”
<CategoricalFilter>::=cat <FieldName> <Exclude> values <FieldValues> \n
#Exclude: “show Segment except banking and healthcare”
Exclude::=ex|ε
#relative date/time filter e.g. last year, previous two month
<RelativeDateFilter>::=rd<FieldName><Units><Duration>\n
<Units>::=days|weeks|months|quarters|years
<Duration>::=number
#date range filter e.g. “between April and July” or “since last year”
<DateRangeFilter>::=dr<FieldName><StartDate><EndDate>\n
#lower and upper bounds of the range
#missing start or end means “at most” or “at least” respectively
#ISO-8601-date-sring is a date in ISO 8601 format
<StartDate>::=start <ISO-8601-date-sring>
<EndDate>::=end <ISO-8601-date-sring>
#numeric range filter e.g. “values between 11 and 17”
#the field can be aggregated e.g. “field1” sum 10 20
<NumericalRangeFilter>::=nr<FieldName><Aggregation><StartNumber>
<EndNumber>
\n
#lower and upper bounds of the range
#missing start or end means “at most” or “at least” respectively
<StartNumber>::=start <number>
<EndNumber>::=end <number>
#how data in the visualization to be sorted
#should be present only if user utterances mention sorting
<Sorting>::=sort:\n<Sort> . . . |ε
#the way data in the visualization to be sorted
#a field can be sorted individually, without affecting other fields in the visualization
#“FieldName”: field to sort, optional, should be used only if user utterance mentions it
```

#SortByField: field to sort by

#Aggregation: aggregation to apply to sortByField e.g. sort Region by sum of sales

#Direction: sort direction, ascending or descending

#Limit: how many items to include

<Sort>::=<SortByField><Aggregation><Direction> <Limit><FieldName>\n

<Direction>::=asc|desc|ε

<Limit>::=<number>|ε

#type of the chart to be used in the visualization

#should be iuncluded only if user utterances mention chart type

<ChartType>::=chart:\n ChartTypeValue|ε

<ChartTypeValue>::=text|heatmap|bar|stackedbar|line|area|gantt|scatterplot|histogram|symbolmap|filledmap|treemap|pie

#pick field names and values from the supplied dataset extract

#put them in double quotes e.g. "Sales", "Furniture"

<FieldName>::="quoted-field-name"

<SortByField>"quoted-field-name"

<FieldValues>"space-separated-quoted-string-values"

The shorthand notation not only achieved a significant reduction in token count but also maintained a high consistency with the original visualization specifications. Through the use of the CFG, the LLM was guided to generate shorthand notation that could be unambiguously parsed and converted back to the full JSON format, ensuring that the visualizations generated met the user's requirements accurately.

An example prompt is shown below, according to some implementations.

You are a service for translating user requests to data visualization based on a specified dataset fields metadata and values, according to the best practices of visual analytics.

The visualization should be as concise as possible and include only the minimal subset of the dataset fields that satisfies the user query, selected based on the field names, types and values, without duplicates.

Start with the previously generated spec if one is provided, and modify it according to the user query.

Create a new visualization spec if the previously generated one not provided, or user asks to start over e.g. "start from scratch". Update the existing spec otherwise.

BE CONCISE AND DIRECT.

You'll be presented with a snapshot of the target dataset: field names, their data types and some of the values. Use your best judgement to select the fields to represent entities mentioned in the user request.

You may only add or replace a field or value in the spec if they're mentioned by the user query AND present in the dataset.

Make sure categorical filters use only values listed in the dataset.

Assume current date is {{{current_date}}}

Special Cases:

Address the user directly and concisely in your reply, in first-person form.

Pretend you are talking about a Tableau viz, not a specification. Talk as if it was done in the past, not as if you are presenting a result Simply refer to the "visualization" as "viz"

If the current viz does not require changing, you can omit it from your output and only output the user friendly reply Phrases such as "show only", "only include", "filter by", "filter to" mean you should add to existing filters instead of replacing them Phrases such as "day over day", "over time" imply rendering a trend as a line chart. Choose the best date field with the proper granularity in "aggregation"

Phrases such as "top . . . " or "bottom . . . " imply using a sort with a limit. Set the limit to 5 if the user does not specify a number If you can't generate a viz that satisfies the query, return the last notional spec (unchanged) followed by a generic one-sentence saying why that was not possible. If there is no last notional spec, return an empty viz Generate the viz specs in a shorthand notation defined by BNF notation provided below:

{{> shorthand-grammar}}

Example Results

Implementing a domain-specific shorthand (DSS) guided by Context free grammar (CFG) demonstrated a notable decrease in the token count necessary for representing structured data. For visualization generation, the shorthand notation facilitated a 78% reduction in token count when juxtaposed with the conventional JSON format. This reduction directly correlates with diminished computational costs and latency in generating visualizations via large language models (LLMs), leading to enhanced response times for users and reduced operational expenses for services leveraging LLMs for dynamic visualization tasks.

The efficacy of the proposed methodology is underscored by its capacity to preserve the integrity of structured data while minimizing the resources required for its generation. The employment of CFG in the development of the shorthand notation ensures the data's definition remains clear and unambiguous, thereby simplifying the parsing process and enabling seamless conversion back to standard data formats. This advantage extends beyond mere cost and latency reductions, encompassing ease of implementation and system flexibility.

The broad applicability of this approach spans various domains necessitating the generation of structured data for API payloads, including but not limited to virtual assistants and agents, automated reporting and analytics, natural language interfaces for data processing, automation of unstructured data processing, and similar applications. The integration of DSS and CFG into structured data generation processes could significantly transform data management within Generative AI applications, making it viable to deploy advanced models in scenarios previously hindered by cost or latency barriers. Moreover, this strategy may catalyze the creation of new domain-specific languages (DSLs) tailored to diverse applications, thereby improving the efficiency and accessibility of LLMs in structured data generation tasks.

Some implementations dynamically adapt the shorthand notation based on the domain-specific vocabulary and common patterns observed in the data. This could involve machine learning techniques to evolve the shorthand notation over time, improving efficiency and reducing token count further.

Some implementations include error correction and feedback mechanisms. Some implementations include mechanisms within the CFG to detect and correct errors in shorthand notation generation. Incorporating feedback loops that allow the CFG to learn from corrections could improve the accuracy and reliability of the shorthand notation over time.

Some implementations integrate the shorthand notation and CFG with existing domain-specific languages in various fields, such as finance, healthcare, and engineering, to facilitate more natural and efficient data representation and processing within those domains.

In this way, the systems, methods and interfaces described above enhance the efficiency of generating structured data through large language models (LLMs) by introducing a domain-specific shorthand (DSS) combined with Context free grammar (CFG). The techniques described herein address the high token count, latency, and operational costs associated with producing structured data formats, such as JSON, YAML, and XML, in generative AI applications. By designing a shorthand notation specific to particular domains and utilizing CFG for its description and parsing, some implementations achieve a substantial reduction in the number of tokens required for data generation. Specifically, in the context of generating visualizations, experiments showed a 78% decrease in token generation, which correspondingly led to reductions in latency and costs, especially when employing large models, such as GPT-4.

The application of DSS and CFG in this manner directly impacts the operational efficiency of generative AI applications by lowering the necessary computational resources. This efficiency improvement is crucial for enabling the deployment of LLMs in scenarios with limited computational capacity or in real-time applications. Moreover, our methodology offers a scalable way to simplify the interaction between human operators and AI systems, making complex data generation tasks more manageable and cost-effective. Additionally, employing CFG for the description and parsing of shorthand notation underscores the potential for creating more dynamic, flexible, and reliable AI models. This structured approach to data generation with LLMs facilitates the production of more predictable outputs, enhancing the trustworthiness of AI-generated content. It also suggests a pathway toward more standardized and interoperable AI systems, which could accelerate the integration of AI technologies across various sectors.

Figure 3:
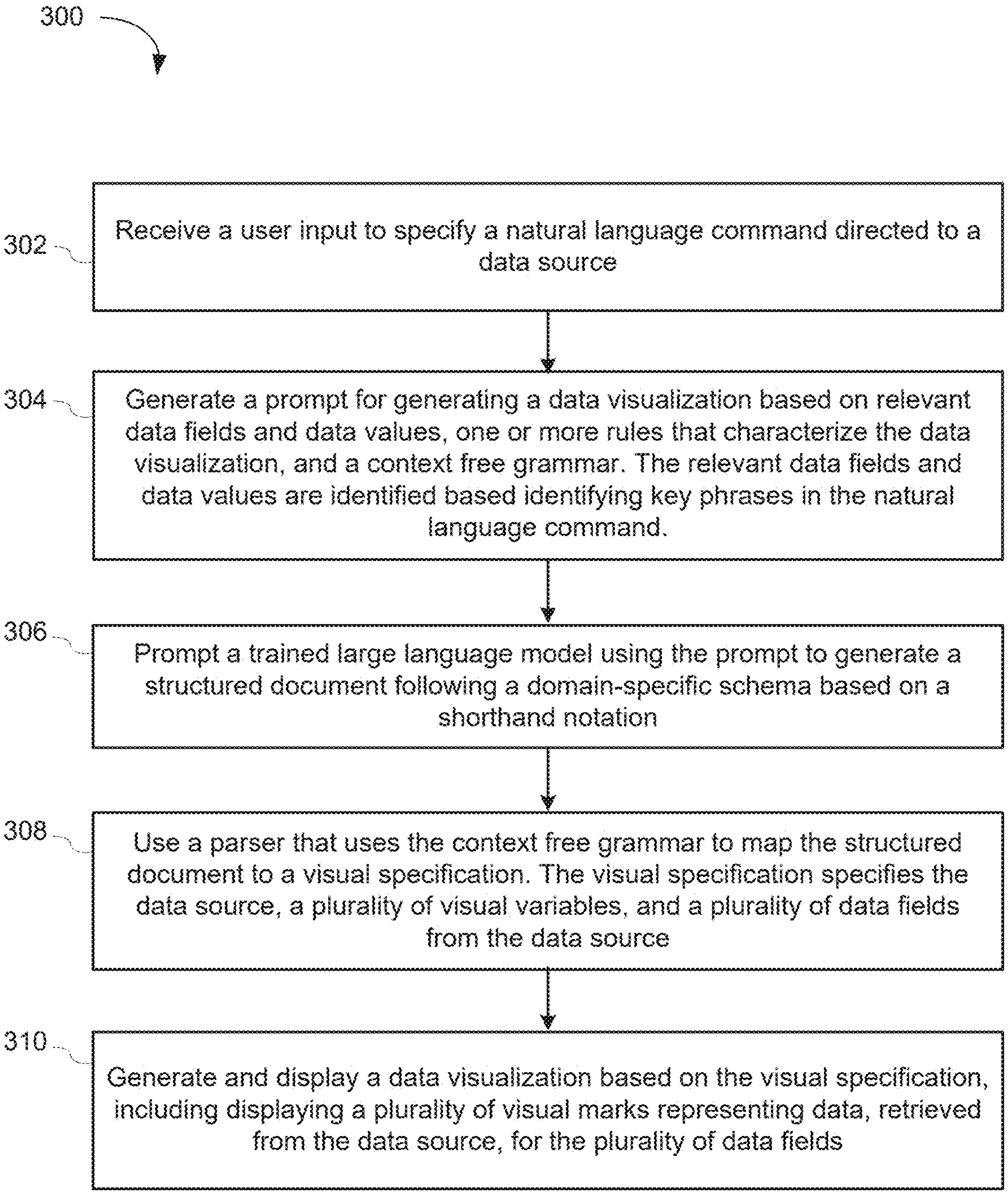
FIG. 3 is a flowchart of an example method for generating data visualizations from natural language expressions, according to some implementations.

FIG. 3 is a flowchart of an example method 300 for generating data visualizations from natural language expressions, according to some implementations. The method is performed at a computing device (e.g., the computing device 200) having one or more processors (e.g., the processors 202), and memory (e.g., the memory 206) storing one or more programs configured for execution by the one or more processors.

The method includes receiving (302, e.g., by the language processing module 238) a user input to specify a natural language command directed to a data source (e.g., the data source 248-1). Example of natural language commands include utterances, such as "Show electronics sales by region," "Number of activations last year in CA, OR and WA," and "Most expensive cities on the west coast."

The method also includes generating (304, e.g., by the prompt module 240) a prompt for generating a data visualization based on relevant data fields and data values, one or more rules that characterize the data visualization, and a context free grammar. Example rules include phrases, such as "show only", "only include", "filter by", "filter to". The phrase "filter to," for example, suggests that an LLM add to existing filters instead of replacing the filters. Phrases, such as "day over day", "over time" imply rendering a trend as a line chart. Such phrases, for example, can suggest that an LLM can choose the best date field with the proper granularity in "aggregation". Phrases such as "top . . . " or "bottom . . . " imply using a sort with a limit. The limit may be set to 5, for example if a user does not specify a number. In some implementations, the method further includes parsing (e.g., by the parsing module 242) the natural language command to identify key phrases, and identifying the relevant data fields and data values from the data source using semantic search, based on the key phrases. For example, for the utterance "Most expensive cities on the west coast," the key phrases "expensive", "cities" and "west coast" are identified and mapped to Price, City and State fields, respectively, of a target data source. The State fields can include values in [CA, OR, WA]. Some implementations compute embeddings and/or perform approximate nearest neighbor search with a vector database, for the semantic search.

In some implementations, the method further includes encoding data, for a current visualization (e.g., encoding data for the current visual specification 104), based on the shorthand notation and the context free grammar, and while prompting the trained large language model, inputting the encoded data along with the prompt, to generate the structured document. For updating an existing visualization based on a new utterance, some implementations include a shorthand specification for the current visualization into the prompt along with the new utterance and ask (or prompt) the LLM to update the visual specification.

In some implementations, the context free grammar includes one or more grammar rules for specifying data fields from an underlying data source to be used in the data visualization, field type, how field values are mapped to visual properties including color, size, shape and position, filters to apply to data used in the data visualization, and how data in the data visualization is to be sorted, type of chart to be used in the data visualization. In some implementations, the trained large language model is trained on a dataset of JSON, YAML, XML, and/or Python code, which represents a desired structure of output documents. In some implementations, the context free grammar allows unambiguous conversion of an input in the shorthand notation back to a full visual specification, ensuring no loss of information in visualization requirements. In some implementations, the domain-specific schema captures visualization components, including fields, filters, and sorting criteria, which are common across various visualization types. In some implementations, the shorthand notation is dynamically adapted based on a domain-specific vocabulary and common patterns observed in data, including applying one or more machine learning algorithms to evolve the shorthand notation over time. In some implementations, the context free grammar detects and/or corrects errors in processing shorthand notation, incorporating feedback loops that allow the context free grammar to learn from corrections, thereby improving accuracy and/or reliability of the shorthand notation over time.

The method also includes prompting (306, e.g., by the prompt module 240) a trained large language model (e.g., the language model 244) using the prompt to generate a structured document following a domain-specific schema based on a shorthand notation. In some implementations, the shorthand notation reduces the number of tokens required to represent visualization specifications for improving token efficiency of the trained large language model.

The method also includes using a parser (308, e.g., by the parsing module 242) that uses the context free grammar to map the structured document to a visual specification (e.g., the visual specification 236). The visual specification specifies the data source, a plurality of visual variables, and a plurality of data fields from the data source.

The method also includes generating and displaying (310, e.g., by the data visualization generation module 234) a data visualization based on the visual specification, including displaying a plurality of visual marks representing data, retrieved from the data source, for the plurality of data fields.

In this way, the techniques described herein leverage domain-specific shorthand and context free grammar for structured data generation with large language models. By mitigating issues related to token count, latency, and operational costs, these techniques not only improve the efficiency of generative AI applications (e.g., data visualization generation and/or display) but also contributes to the broader objective of advancing AI accessibility, reliability, and utility across diverse applications.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

Some embodiments or implementations are described with respect to the following clauses:

Clause A1. A method for generating data visualizations from natural language expressions, comprising:

at a computing device having a display, one or more processors, and memory storing one or more programs configured for execution by the one or more processors:

receiving a user input to specify a natural language command directed to a data source;

generating a prompt for generating a data visualization based on relevant data fields and data values, one or more rules that characterize the data visualization, and a context free grammar, wherein the relevant data fields and data values are identified based identifying key phrases in the natural language command;

prompting a trained large language model using the prompt to generate a structured document following a domain-specific schema based on a shorthand notation;

using a parser that uses the context free grammar to map the structured document to a visual specification, wherein the visual specification specifies the data source, a plurality of visual variables, and a plurality of data fields from the data source; and generating and displaying a data visualization based on the visual specification, including displaying a plurality of visual marks representing data, retrieved from the data source, for the plurality of data fields.

Clause A2. The method of clause A1, further comprising:

encoding data, for a current visualization, based on the shorthand notation and the context free grammar; and while prompting the trained large language model, inputting the encoded data along with the prompt, to generate the structured document.

Clause A3. The method of any of clauses A1-A2, further comprising:

parsing the natural language command to identify key phrases; and identifying the relevant data fields and data values from the data source using semantic search, based on the key phrases.

Clause A4. The method of any of clauses A1-A3, wherein the context free grammar includes one or more grammar rules for specifying data fields from an underlying data source to be used in the data visualization, field type, how field values are mapped to visual properties including color, size, shape and position, filters to apply to data used in the data visualization, and how data in the data visualization is to be sorted, type of chart to be used in the data visualization.

Clause A5. The method of any of clauses A1-A4, wherein the trained large language model is trained on a dataset of JSON, YAML, XML, and/or Python code, which represents a desired structure of output documents.

Clause A6. The method of any of clauses A1-A5, wherein the shorthand notation reduces the number of tokens required to represent visualization specifications for improving token efficiency of the trained large language model.

Clause A7. The method of any of clauses A1-A6, wherein the context free grammar allows unambiguous conversion of an input in the shorthand notation back to a full visual specification, ensuring no loss of information in visualization requirements.

Clause A8. The method of any of clauses A1-A7, wherein the domain-specific schema captures visualization components, including fields, filters, and sorting criteria, which are common across various visualization types.

Clause B1. A computing device, comprising:

one or more processors;

memory coupled to the one or more processors;

a display; and one or more programs stored in the memory and configured for execution by the one or more processors, the one or more programs comprising instructions for any of clauses A1-A8.

C1. A non-transitory computer readable storage medium storing one or more programs, the one or more programs configured for execution by a computing device having one or more processors, memory, and a display, the one or more programs comprising instructions for any of clauses A1-A8.

What is claimed is:

1. A method for generating data visualizations from natural language expressions, comprising:

at a computing device having a display, one or more processors, and memory storing one or more programs configured for execution by the one or more processors:

receiving a user input to specify a natural language command directed to a data source;

generating a prompt for generating a data visualization based on relevant data fields and data values, one or more rules that characterize the data visualization, and a context free grammar, wherein the relevant data fields and data values are identified based on identifying key phrases in the natural language command;

prompting a trained large language model using the prompt to generate a structured document following a domain-specific schema based on a shorthand notation, wherein the shorthand notation reduces a number of tokens required to represent visualization specifications for improving token efficiency of the trained large language model;

using a parser that uses the context free grammar to map the structured document to a visual specification, wherein the visual specification specifies the data source, a plurality of visual variables, and a plurality of data fields from the data source; and generating and displaying a data visualization based on the visual specification, including displaying a plurality of visual marks representing data, retrieved from the data source, for the plurality of data fields.

2. The method of claim 1, further comprising:

encoding data, for a current visualization, based on the shorthand notation and the context free grammar; and while prompting the trained large language model, inputting the encoded data along with the prompt, to generate the structured document.

3. The method of claim 1, further comprising:

parsing the natural language command to identify key phrases; and identifying the relevant data fields and data values from the data source using semantic search, based on the key phrases.

4. The method of claim 1, wherein the context free grammar includes one or more grammar rules for specifying data fields from an underlying data source to be used in the data visualization, field type, how field values are mapped to visual properties including color, size, shape and position, filters to apply to data used in the data visualization, and how data in the data visualization is to be sorted, type of chart to be used in the data visualization.

5. The method of claim 1, wherein the trained large language model is trained on a dataset of JSON, YAML, XML, and/or Python code, which represents a desired structure of output documents.

6. The method of claim 1, wherein the context free grammar allows unambiguous conversion of an input in the shorthand notation back to a full visual specification, ensuring no loss of information in visualization requirements.

7. The method of claim 1, wherein the domain-specific schema captures visualization components, including fields, filters, and sorting criteria, which are common across various visualization types.

8. A computing device, comprising:

one or more processors;

memory coupled to the one or more processors;

a display; and one or more programs stored in the memory and configured for execution by the one or more processors, the one or more programs comprising instructions for:

receiving a user input to specify a natural language command directed to a data source;

generating a prompt for generating a data visualization based on relevant data fields and data values, one or more rules that characterize the data visualization, and a context free grammar;

prompting a trained large language model using the prompt to generate a structured document following a domain-specific schema based on a shorthand notation, wherein the shorthand notation reduces a number of tokens required to represent visualization specifications for improving token efficiency of the trained large language model;

using a parser that uses the context free grammar to map the structured document to a visual specification, wherein the visual specification specifies the data source, a plurality of visual variables, and a plurality of data fields from the data source; and generating and displaying a data visualization based on the visual specification, including displaying a plurality of visual marks representing data, retrieved from the data source, for the plurality of data fields.

9. The computing device of claim 8, wherein the one or more programs further comprise instructions for:

encoding data, for a current visualization, based on the shorthand notation and the context free grammar; and while prompting the trained large language model, inputting the encoded data along with the prompt, to generate the structured document.

10. The computing device of claim 8, wherein the one or more programs further comprise instructions for:

parsing the natural language command to identify key phrases; and identifying the relevant data fields and data values from the data source using semantic search, based on the key phrases.

11. The computing device of claim 8, wherein the context free grammar includes one or more grammar rules for specifying data fields from an underlying data source to be used in the data visualization, field type, how field values are mapped to visual properties including color, size, shape and position, filters to apply to data used in the data visualization, and how data in the data visualization is to be sorted, type of chart to be used in the data visualization.

12. The computing device of claim 8, wherein the trained large language model is trained on a dataset of JSON, YAML, XML, and/or Python code, which represents a desired structure of output documents.

13. The computing device of claim 8, wherein the context free grammar allows unambiguous conversion of an input in the shorthand notation back to a full visual specification, ensuring no loss of information in visualization requirements.

14. The computing device of claim 8, wherein the domain-specific schema captures visualization components, including fields, filters, and sorting criteria, which are common across various visualization types.

15. A non-transitory computer readable storage medium storing one or more programs, the one or more programs configured for execution by a computing device having one or more processors, memory, and a display, the one or more programs comprising instructions for:

receiving a user input to specify a natural language command directed to a data source;

generating a prompt for generating a data visualization based on relevant data fields and data values, one or more rules that characterize the data visualization, and a context free grammar;

prompting a trained large language model using the prompt to generate a structured document following a domain-specific schema based on a shorthand notation, wherein the shorthand notation reduces a number of tokens required to represent visualization specifications for improving token efficiency of the trained large language model;

using a parser that uses the context free grammar to map the structured document to a visual specification, wherein the visual specification specifies the data source, a plurality of visual variables, and a plurality of data fields from the data source; and generating and displaying a data visualization based on the visual specification, including displaying a plurality of visual marks representing data, retrieved from the data source, for the plurality of data fields.

16. The non-transitory computer readable storage medium of claim 15, wherein the one or more programs further comprise instructions for:

encoding data, for a current visualization, based on the shorthand notation and the context free grammar; and while prompting the trained large language model, inputting the encoded data along with the prompt, to generate the structured document.

17. The non-transitory computer readable storage medium of claim 15, wherein the one or more programs further comprise instructions for:

parsing the natural language command to identify key phrases; and identifying the relevant data fields and data values from the data source using semantic search, based on the key phrases.

18. The non-transitory computer readable storage medium of claim 15, wherein the context free grammar includes one or more grammar rules for specifying data fields from an underlying data source to be used in the data visualization, field type, how field values are mapped to visual properties including color, size, shape and position, filters to apply to data used in the data visualization, and how data in the data visualization is to be sorted, type of chart to be used in the data visualization.

* * * * *